United States Patent
Boldin et al.

[11] Patent Number: 5,933,331
[45] Date of Patent: Aug. 3, 1999

[54] BATTERY COUPLING APPARATUS

[75] Inventors: Detlef Boldin, Effeltrich; Karl Fischer, Hemhofen, both of Germany

[73] Assignee: Siemens Aktiengesellschaft, München, Germany

[21] Appl. No.: 09/091,047

[22] PCT Filed: Nov. 29, 1996

[86] PCT No.: PCT/DE96/02294

§ 371 Date: Jun. 8, 1998

§ 102(e) Date: Jun. 8, 1998

[87] PCT Pub. No.: WO97/22171

PCT Pub. Date: Jun. 19, 1997

[30] Foreign Application Priority Data

Dec. 12, 1995 [DE] Germany ............... 1 95 46 421

[51] Int. Cl.⁶ ............. H02M 3/335; H02M 3/24; G05F 1/40
[52] U.S. Cl. ............. 363/16; 363/98; 363/132; 323/285; 323/351
[58] Field of Search ............. 323/282, 285, 323/286, 351; 363/37, 35, 45, 16, 98, 132

[56] References Cited

U.S. PATENT DOCUMENTS

| | | | |
|---|---|---|---|
| 4,823,427 | 4/1989 | Tamoto | 323/266 |
| 4,985,819 | 1/1991 | Mori et al. | |
| 5,019,952 | 5/1991 | Smolenski et al. | 323/285 |
| 5,027,264 | 6/1991 | DeDonckker et al. | 363/16 |
| 5,440,179 | 8/1995 | Severinsky | |
| 5,592,371 | 1/1997 | Rajashekara et al. | 363/98 |

FOREIGN PATENT DOCUMENTS

| | | |
|---|---|---|
| 0 089 544 | 9/1983 | European Pat. Off. |
| 31 04 965 | 8/1982 | Germany |
| 31 41 139 | 4/1983 | Germany |
| 39 35 243 | 4/1991 | Germany |
| 6245540 | 9/1994 | Japan |

OTHER PUBLICATIONS

"Modelling the Three Phase Propulsion System of a Modern Multisystem–Locomotive," Geissler et al., European Conference on Power Electronics & Application, 4th Meeting, Sep. 3–6, 1991, Firenze, pp. 632–637.

"IGBT–Modules in Converters: Regulation, Control and Protection," Bösterling et al., PowerElectronics, Germany, vol. 110, No. 10, 1989, pp. 464–474. Described in the Specification.

*Primary Examiner*—Robert E. Nappi
*Assistant Examiner*—Rajnikant B. Patel
*Attorney, Agent, or Firm*—Kenyon & Kenyon

[57] ABSTRACT

An apparatus for coupling a battery to a mains-powered Sc link circuit of a converter. The this apparatus has two capacitors and two converter bridge arms which are each connected electrically in parallel with a capacitor. The apparatus also includes an inductor which connects the centre terminals of the two converter bridge arms to one another, and a semiconductor power switch which makes it possible to connect the positive terminals of the two converter bridge arms. In addition, the apparatus includes a control electronics with downstream driver stages which control electronics use determined actual values of this apparatus, a mains failure signal and an inductor current setpointvalue to generate control signals. A battery coupling apparatus is thus obtained by means of which the battery is not continuously loaded with alternating current, and the opportunity for battery maintenance exists in order to increase the battery life.

10 Claims, 1 Drawing Sheet

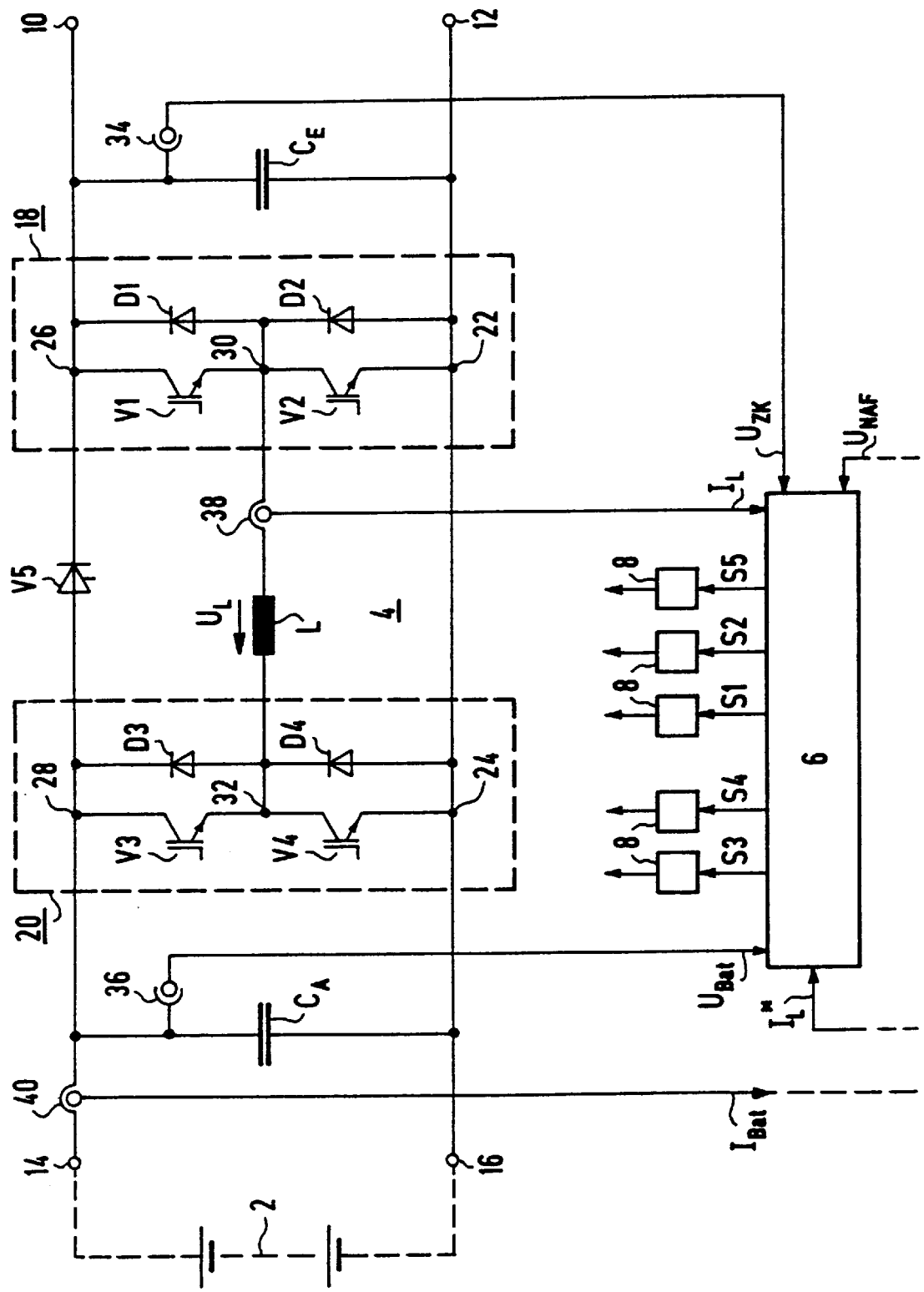

BATTERY COUPLING APPARATUS

FIELD OF THE INVENTION

The present invention relates to an apparatus for coupling a battery to a mains-powered DC link circuit of a converter.

BACKGROUND INFORMATION

German Patent Application No. 39 35 243 describes a conventional invertor circuit including a controlled rectifier, a DC link circuit, an invertor, and a battery. An alternating-current source is connected to the input of the controlled rectifier. The input AC voltage is converted into a DC voltage, whose value is controlled to a setpoint value by phase control of the thyristors in the controlled rectifier. The inverter converts this generated DC voltage into a predetermined AC voltage, which is supplied to a load. The DC voltage includes ripple voltage components which are produced by the rectification of the input AC voltage. These ripple voltage components are damped via an inductor and a capacitor in the DC link circuit, so that a DC voltage with a reduced ripple component passes to the inverter. The battery is connected in parallel with the DC voltage output of the controlled rectifier. In this state, the battery is charged in "floating" manner. However, if the charging current for the battery contains ripple components, then they produce heat in the battery, placing an additional stress on the battery. The inductor in the DC link circuit damps these ripple components to a defined magnitude. Such an inverter circuit can be used as a power supply unit which is protected against mains failure, also called an uninterruptable power supply (UPS).

There is now a contradiction in the design of the inductor. The inverter requires an inductor having low inductance while, in contrast, an inductor having high inductance is required while the battery is being charged, in order to suppress the ripple components. As described in German Patent Application No. 39 35 243, this discrepancy is solved by arranging a saturable inductor or an inductor having a device for suppressing the magnetic flux during charging in a supply lead to the battery.

Using this battery coupling apparatus, the battery is always connected to the DC link circuit of the inverter circuits (the battery is continuously loaded with alternating current). In addition, it is not possible to carry out controlled charging and discharging with an adjustable current for cycling purposes (battery maintenance).

A plurality of variants of a DC pulse-controlled converter are described in German Patent Application No. 31 04 965. Using the plurality of variants a battery can be charged from an AC mains, it being possible for the peak value of the mains AC voltage to be less than or greater than the voltage of the battery to be charged. The individual DC pulse-controlled converter variants differ by having different combinations repective series circuits of known step-up controllers and step-down controllers. Power transistors having a high switching frequency are used in each of the DC pulse-controlled converters. If required, frequency thyristors can also be used as an alternative for this purpose. The thyristors in the DC pulse-controlled converters are just switched at twice the mains frequency. As a result of the combination respective series connection of conventional step-up and step-down controllers, the DC pulse-controlled converters are of simple design, low weight and can be produced economically. However, it is disadvantageous that the energy flow is possible in only one direction, to be precise from the AC mains to the battery.

A step-up/step-down controller combination is described in the paper "Modelling the Three Phase Propulsion system of a Modern Multisystem Locomotive" by W. Geissler and F. Unger-Weber, printed in the EPE'91 Conference Proceedings, Florence, 4th Meeting, pages 4–632 to 4–637. This controller combination comprises two converter bridge arms which are each connected electrically in parallel with a capacitor and whose negative terminazls are connected to one another. In addition, an inductor is provided which connects the center terminals of the two converter bridge arms to one another. Thyristors which can be turned off and to each of which a freewheeling diode is assigned are provided as the active converter devices in both converter bridge arms. If the distribution line voltage (input voltage) is greater than the DC link voltage, then this controller acts as a step-down controller, it being possible to regulate the inductor current by pulsing an active converter device. If the DC link voltage is greater than the distribution line voltage, then this controller acts as a step-up controller, it likewise being possible to regulate the inductor current by pulsing an active converter device. The advantage of this controller circuit is that it is possible to alternate continuously between the step-down and step-up function. The disadvantage is that the thyristors which can be turned off and the associated freewheeling diodes have to carry the entire load current, as a result of which a high power loss always occurs in the semiconductor components used.

SUMMARY OF THE INVENTION

An object of the present invention is to provide a battery coupling apparatus with the battery is not continuously loaded with alternating current and can be maintained, as a result of which the battery life time is increased.

The fact that the battery coupling apparatus comprises a DC/DC converter, a semiconductor power switch and control electronics results in the following advantages:

Since the semiconductor power switch is not switched on until a mains failure signal occurs, the battery is decoupled from the DC link circuit of the converter when the mains voltage is present, in contrast to the previous solution described initially. In consequence, the battery is not continuously loaded with alternating current (continuous loading). This means that the fully charged battery is disconnected from the DC link circuit of the converter.

Energy can be exchanged between the battery and the DC link circuit of the converter in both directions using the DC/DC converter, depending on whether the operating mode is "battery discharge test" or "battery charging".

Controlled discharging of the battery can be carried out with a small discharge current and subsequent charging (cycling) using the DC/DC converter, as a result of which reversible aging of the battery is overcome and the battery life time can thus be increased (battery maintenance).

The battery can be charged and discharged for the battery test at any mains voltage using the DC/DC converter.

The triggered semiconductor power switch can be turned off again using the DC/DC converter, as a result of which an additional commutation device is saved.

Since the DC/DC converter is designed for only a small portion of the entire discharge power, the battery coupling apparatus has a minimal power loss.

BRIEF DESCRIPTION OF DRAWING

The FIGURE shows an exemplary embodiment of a battery coupling apparatus according to the present invention.

DETAILED DESCRIPTION OF THE INVENTION

In order to explain the present invention further, reference is made to the drawing which illustrates schematically a exemplary embodiment of the battery coupling apparatus according to the present invention.

The apparatus according to the present invention for coupling a battery 2 to a mains-powered DC link voltage circuit of a converter, (not shown) has a semiconductor power switch V5, a DC/DC converter 4 and control electronics 6 with downstream driver stages 8. The DC/DC converter 4 has two capacitors $C_E$ and $C_A$ which are each connected electrically in parallel with the input terminals 10 and 12 and, respectively, with the output terminals 14 and 16, to which the battery 2 can be connected. In addition, there are two converter bridge arms 18 and 20, which are each connected electrically in parallel with a capacitor $C_E$ and, respectively, $C_A$.

The capacitors $C_E$ and $C_A$ on the DC link circuit side and the battery side of the battery coupling apparatus have to carry the alternating current which is produced by the coupling apparatus. The capacitor $C_E$ on the input side is subject to its greatest alternating current load in the discharge mode when the DC link voltage of the converter is at a maximum and the battery voltage $U_{Bat}$ (final discharge voltage) is at a minimum. The output capacitor $C_A$ carries the greatest alternating current in the charging mode when the mains voltage is low. Because of the high possible battery and DC link circuit voltage of the converter, the capacitor $C_E$ on the input side and the output capacitor $C_A$ may comprise two series-connected capacitors, the voltage share being balanced using resistors.

The converter bridge arm 18 or, respectively, 20 comprises a series circuit of two active converter devices V1 and V2 or, respectively, V3 and V4, each of which has a freewheeling diode D1 and D2 or, respectively, D3 and D4 connected in parallel with it. The negative terminals 22 and 24 of these two converter bridge arms 18 and 20 are electrically conductively connected to one another. In consequence, the negative input terminal 12 is connected through to the negative output terminal 16. The positive terminals 26 and 28 of these two converter bridge arms 18 and 20 may be connected to one another using the semiconductor power switch V5 in such a manner that a current can flow from the positive output terminal 14 to the positive input terminal 10. The center terminals 30 and 32 of the two converter bridge arms 18 and 20 are connected to one another using an inductor L.

The inductance of the inductor L is chosen such that a current ripple of, for example, 0.2. $I_L$ occurs on the inductor L when the voltage time integral is at a maximum. The greatest voltage time integral occurs on the inductor L in the charging mode, when it is necessary to charge at 2.4 V per battery cell when the DC link circuit voltage is very low.

Furthermore, measurement detection devices 34, 36, 38 and 40 are mostly also present, by means of which the actual values of the DC link voltage $U_{ZK}$, of the battery voltage $U_{Bat}$, of the inductor current $I_L$ and of the battery current $I_{Bat}$ are determined. The actual values of the DC link voltage $U_{ZK}$, of the battery voltage $U_{Bat}$ and of the inductor current $I_L$ are supplied to the control electronics 6. In addition, a mains failure signal $U_{NAF}$ and an inductor current setpoint value $I^*_L$ are supplied to these control electronics 6. The control electronics 6 use these signals $U_{ZK}$, $U_{Bat}$, $I_L$, $I^*_L$ and $U_{NAF}$ to calculate control signals S1 to S5 for the active converter devices V1 to V4 and the semiconductor power switch V5, the signals being converted into drive signals using the downstream driver stages 8.

Field-controlled semiconductor components which can be turned off are provided in each case as the active converter devices V1 to V4 in the two converter bridge arms 18 and 20 and as the semiconductor power switch V5. As shown in the Figure, Insulated Gate Bipolar Transistors (IGBT) are provided as the active converter devices V1 to V4. MOS Controlled Thyristors (MCT) or MOS Field-Effect Transistors (MOSFET) can also be used. A thyristor is provided as the semiconductor power switch V5 in the Figure. An MOS Controlled Thyristor (MCT) or an MOS Field-Effect Transistor (MOSFET), with which a diode is connected in series, or a thyristor (GTO) which can be turned off can also be provided.

A control section for an IGBT, comprising control electronics with a microprocessor, DC isolation and a driver stage, is illustrated and described in (IGBT-Modules in Converters: Resolution, Control and protection), "IGBT-Module in Stromrichtern: regeln, steuern, schuitzen", printed in the "etz"(Power Electronics Journal), Germany Volume 110 (1989), Issue 10, pages 464 to 471. In consequence, it is possible to dispense with the illustration and description of an embodiment of a driver stage 8 at this point.

The following is a detailed explanation of an exemplary method of operation of the battery coupling apparatus according to the present invention.

As soon as a mains monitor, (not shown in detail), identifies a mains or phase failure, a mains failure signal $U_{NAF}$ is transmitted to the control electronics 6. The semiconductor power switch V5 is triggered on the basis of this signal $U_{NAF}$, so that the battery 2 immediately buffers the voltage in the DC link circuit of the converter. In order to ensure deep-discharge protection, the inverter in the converter is switched off at the battery final discharge voltage. The semiconductor power switch is then also turned off after an adjustable time, in order to decouple the battery 2 from the DC link circuit. When the mains returns, the mains failure signal $U_{NAF}$ and the control signal S5 are suppressed, so that the control electronics 6 can generate control signals S2 and S3 for the active converter devices V2 and V3 in the two converter bridge arms 18 and 20. These two active converter devices V2 and V3 remain switched on until the inductor current $I_L$ is greater than the discharge current. The inductor L can then turn off the semiconductor power switch V5, via the active converter device V3 and the freewheeling diode D1, by turning off the active converter device V2.

The actual values of the battery voltage $U_{Bat}$, DC link circuit voltage $U_{ZK}$ and inductor current $I_L$ are required to control the active converter devices V1 to V4 while the battery 2 is being charged. A setpoint inductor current value $I^*_L$ is supplied to the control electronics 6 from a battery management device, (not shown in detail) depending on the actual battery current value $I_{Bat}$. The inductor current $I_L$ is regulated using this reference value $I^*_L$ such that the battery current $I_{Bat}$ is indirectly held at a constant value. The active converter devices V1 to V4 are switched on and off respectively pulsed depending on the actual values of the DC link voltage $U_{ZK}$ and of the battery voltage $U_{Bat}$. This is also applied to controlled discharging with a low discharge current.

This discharging down to the final discharge voltage with a low discharge current makes possible a battery test without aging the battery 2 by a high-current discharge. Even reversible aging of the battery can be overcome, and the battery life time thus is increased (battery maintenance) with an appropriate combination of controlled charging and discharging.

A battery 2 can be connected using this battery coupling apparatus according to the present invention to any DC link circuit of a converter, thus avoiding the battery 2 being continuously loaded with alternating current and measures for maintenance of the battery 2 being available.

What is claimed is:

1. A device for coupling a battery to a mains-powered DC link circuit of a converter, comprising:
   a first capacitor coupled in parallel to an input of the device, the input of the device including a positive input terminal and a negative input terminal;
   a second capacitor coupled in parallel to an output of the device and to the first capacitor, the output of the device including a positive output terminal and a negative output terminal;
   a first converter bridge arm coupled in parallel to the first capacitor and having a first center terminal, a first negative bridge terminal and a first positive bridge terminal, the first converter bridge arm including at least one first active converter device;
   a second converter bridge arm coupled in parallel to the second capacitor and having a second center terminal, a second negative bridge terminal and a second positive bridge terminal, the second negative bridge terminal being coupled to the first negative bridge terminal, the second converter bridge arm including at least one second active converter device;
   an inductor coupling the first center terminal to the second center terminal;
   a semiconductor power switch for coupling the first positive bridge terminal to the second positive bridge terminal and for allowing current to flow from the positive output terminal to the positive input terminal; and
   control electronics including a plurality of downstream driver stages, the control electronics determining control signals for the at least one first active converter device, the at least one second active converter device, and the semiconductor power switch as a function of at least one actual value, a main signal failure signal and an inductor current setpoint value.

2. The device according to claim 1, wherein each of the at least one first active converter device, the at least one second active converter device and the semiconductor power switch includes a field-controlled semiconductor component, the field-controlled semiconductor component capable of being turned off.

3. The device according to claim 1, wherein each of the at least one first active converter device and the at least one second active converter device is coupled to a respective freewheeling diode.

4. The device according to claim 1, wherein the control electronics includes a signal processor.

5. The device according to claim 1, wherein each of the first and second capacitors includes a series circuit including at least two capacitors.

6. The device according to claim 1, wherein the semiconductor power switch includes a thyristor.

7. The device according to claim 2, wherein the field-controlled semiconductor component includes an insulated gate bipolar transistor.

8. The device according to claim 2, wherein the field-controlled semiconductor component includes an MOS controlled thyristor.

9. The device according to claim 2, wherein the field-controlled semiconductor component includes an MOS field-effect transistor, and the semiconductor power switch includes the MOS field-effect transistor and a series-connected diode.

10. The device according to claim 1, wherein the semiconductor power switch includes a thyristor capable of being turned off.

* * * * *